United States Patent [19]

Yagi et al.

[11] Patent Number: 5,674,919

[45] Date of Patent: Oct. 7, 1997

[54] BIAXIALLY ORIENTED FILM OF HIGH MOLECULAR WEIGHT POLYETHYLENE, PROCESS FOR PREPARING THE SAME, SURFACE-MODIFIED BIAXIALLY ORIENTED FILM OF HIGH MOLECULAR WEIGHT POLYETHYLENE AND PROCESS FOR PREPARING THE SAME

[75] Inventors: Kazuo Yagi; Hitoshi Mantoku; Akinao Hashimoto; Isaburo Higashi; Yoshinori Akana, all of Yamaguchi, Japan

[73] Assignee: Mitsui Petrochemical Industries, Ltd., Tokyo, Japan

[21] Appl. No.: 463,369

[22] Filed: Jun. 5, 1995

Related U.S. Application Data

[62] Division of Ser. No. 108,617, Aug. 26, 1993, abandoned.

[30] Foreign Application Priority Data

Dec. 27, 1991 [JP] Japan ........................ 3-346523
Jun. 17, 1992 [JP] Japan ........................ 4-158335

[51] Int. Cl.$^6$ ........................ C08F 110/02; C08J 9/00
[52] U.S. Cl. ........................ 521/143; 521/61; 521/64; 521/132
[58] Field of Search ........................ 521/61, 64, 143, 521/132; 428/516, 304.4

[56] References Cited

U.S. PATENT DOCUMENTS

| | | | |
|---|---|---|---|
| 4,100,238 | 7/1978 | Shinomura | 264/49 |
| 4,268,470 | 5/1981 | Capaccio et al. | 528/502 B |
| 4,525,564 | 6/1985 | Capaccio et al. | 526/348.1 |
| 4,588,633 | 5/1986 | Kono et al. | 428/220 |
| 4,620,955 | 11/1986 | Kono et al. | 264/41 |
| 4,734,196 | 3/1988 | Kono et al. | 210/500.36 |
| 4,828,772 | 5/1989 | Lopatin et al. | 264/45.9 |
| 4,885,077 | 12/1989 | Karakelle et al. | 204/403 |
| 4,937,115 | 6/1990 | Leatherman | 428/36.4 |
| 5,032,450 | 7/1991 | Rechlicz et al. | 428/196 |
| 5,055,248 | 10/1991 | Motooka et al. | 264/210.3 |
| 5,318,866 | 6/1994 | Degen et al. | 429/254 |

FOREIGN PATENT DOCUMENTS

| | | |
|---|---|---|
| 0181016 | 9/1985 | European Pat. Off. . |
| 0288021 | 10/1988 | European Pat. Off. . |
| 0378279 | 7/1990 | European Pat. Off. . |
| 0476198 | 3/1992 | European Pat. Off. . |
| 7135087 | 4/1987 | Germany . |
| 59-227420 | 10/1983 | Japan . |
| 60-255107 | 5/1984 | Japan . |
| 60-255415 | 5/1984 | Japan . |
| 61-241330 | 4/1985 | Japan . |
| 6273924 | 9/1985 | Japan . |
| 6213943 | 12/1985 | Japan . |
| 6339602 | 5/1986 | Japan . |
| 2094356 | 9/1988 | Japan . |
| 3080923 | 8/1989 | Japan . |
| 3105851 | 9/1989 | Japan . |
| 3219552 | 1/1990 | Japan . |
| 3236155 | 2/1990 | Japan . |
| 2164897 | 9/1985 | United Kingdom . |
| 8602656 | 5/1986 | WIPO . |

OTHER PUBLICATIONS

Derwent Abstract, JP2251545, Nitto Denko Corp.
Derwent Abstract, JP2237626, Mitsubishi Rayon KK.

*Primary Examiner*—Mark L. Warzel
*Attorney, Agent, or Firm*—Sherman and Shalloway

[57] ABSTRACT

Biaxially oriented films from high molecular weight polyethylene are characterized by a gas permeable structure formed from random-arranged microfibrils. The films have coefficients of static friction and kinetic friction of not more than 1.0. The biaxially oriented films are further characterized by service smoothness as well as tensile (tangent) modulus and tensile strength. The films may be used for lamination, filter, or for packaging for moisture absorbers. The biaxially oriented films may be obtained by extracting a hydrocarbon plasticizer from a sheet formed from the high molecular weight polyethylene and a hydrocarbon plasticizer, stretching the resulting sheet to obtain an oriented film having a specific surface area of at least 70 m$^2$/g and a fibril structure, and heating the oriented film under a standard length constraint to reduce the oriented film in specific area by at least 20 m$^2$/g.

5 Claims, 1 Drawing Sheet

$3 \mu m$

×10,000

BIAXIALLY ORIENTED FILM OF HIGH MOLECULAR WEIGHT POLYETHYLENE, PROCESS FOR PREPARING THE SAME, SURFACE-MODIFIED BIAXIALLY ORIENTED FILM OF HIGH MOLECULAR WEIGHT POLYETHYLENE AND PROCESS FOR PREPARING THE SAME

This application is a division of application Ser. No. 08/108,617, filed Aug. 26, 1993, now abandoned, and continued as application Ser. No. 08/661,149, filed Jun. 10, 1996, now allowed, which applications are the national phase application of PCT/JP92/01727, filed Dec. 28, 1992.

FIELD OF THE INVENTION

This invention relates to biaxially oriented films of high molecular weight polyethylene, said films having a nonwoven gas permeable structure composed of microfibrils, being low in static coefficient of friction as well as in kinetic coefficient of friction, excellent in tensional modulus (of elasticity) as well as in tensile strength, and also excellent in piercing strength as well as in resistance to ply separation, and to a process for preparing the same. Further, the invention relates also to surface-modified biaxially oriented films of the aforesaid high molecular weight polyethylene, said films having been surface-treated so that the contact angle of the film surface to the water drop becomes not more than 90°.

BACKGROUND OF THE INVENTION

Because of excellence in impact resistance, abrasion resistance and chemical resistance in comparison with general purpose polyethylene, high molecular weight polyethylene having an intrinsic viscosity [η] of at least 5.0 dl/g has heretofore been used as engineering plastics in various fields. It has also been investigated to form films or sheets from the high molecular weight polyethylene having such excellent properties as mentioned above.

However, because the high molecular weight polyethylene is markedly high in melt viscosity in comparison with the general-purpose polyethylene, it is difficult to form said high molecular weight polyethylene by extrusion into film or sheet in such a manner as in the case of the general-purpose polyethylene. On that account, when a film or sheet is formed from the high molecular weight polyethylene, said high molecular weight polyethylene is first extruded into a rod, and the rod is then skived to obtain a film-like product. This process is still employed and practiced by some people, however, it is broadly true at present that almost all the films or sheets of the high molecular weight polyethylene are formed by the compression molding technique. In this connection, a film-like product obtained by skiving a rod extruded from the high molecular weight polyethylene has its strength of about 0.05 GPa, and this film is dense and non-permeable.

Although the films or sheets formed from the high molecular weight polyethylene by the above-mentioned process such as the compression molding technique are relatively high in impact resistance as well as in abrasion resistance, it is difficult to raise the production rate, and no molded products high in tensile strength are obtainable.

Accordingly, it is a common practice for those skilled in the art to prepare films, sheets or fibers excellent in strength from the high molecular weight polyethylene by molding a mixture comprising the high molecular weight polyethylene and a solvent or plasticizer capable of forming a homogeneous mixture together with said polyethylene into a film or the like.

For example, Japanese Patent L-O-P Publn. No. 177035/1982 proposes a process in which high molecular weight polyethylene having a molecular weight of more than one million is incorporated with a low molecular weight hydrocarbon compound to prepare a composition, and from this composition a sheet is formed. In this process, however, the sheet obtained has a tensile strength of about 0.035 GPa.

In this connection, 1 GPa may be converted into about 10,000 kg/cm$^2$.

Furthermore, there are various known processes, for example, a process for obtaining biaxially oriented films of high molecular weight polyethylene by biaxial orientation of a mixture comprising a high molecular weight polyethylene and a solvent or plasticizer capable of forming a homogeneous mixture with said polyethylene, a process for obtaining microporous films by extraction and removal of the solvent or plasticizer contained in the above-mentioned biaxially oriented films of high molecular weight polyethylene, and a process for obtaining biaxially oriented films of high molecular weight polyethylene, wherein a sheet is formed from a mixture comprising a high molecular weight polyethylene and a solvent or plasticizer capable of forming a homogeneous mixture with said polyethylene, the solvent or plasticizer is extracted and removed from said sheet, and this sheet is then biaxially stretched.

For instance, Japanese Patent L-O-P Publn. No. 227420/1984 discloses a process for preparing biaxially oriented films of high molecular weight polyethylene, characterized in that a mixture comprising a high molecular weight polyethylene having an intrinsic viscosity [η] of not less than 5 dl/g and a hydrocarbon plasticizer having a boiling point exceeding the melting point of said polyethylene is biaxially stretched more than 3 times in the lengthwise direction and more than 3 times in the crosswise direction at a temperature in the range of from not less than 60° C. to less than the melting point of said polyethylene. This publication also teaches that axially oriented microporous films of high molecular weight polyethylene are obtained when the hydrocarbon plasticizer is extracted and removed by means of a suitable solvent from the above-mentioned biaxially oriented films of high molecular weight polyethylene.

Japanese Patent L-O-P Publn. No. 84224/1986 discloses a process for obtaining high molecular weight polyethylene films, wherein a gel-like product is prepared by incorporating polyethylene having a weight average molecular weight of at least 400,000 with a relatively volatile solvent which is liquid at room temperature, and this gel-like product is formed into a sheet, followed by biaxial orientation carried out at a temperature of 75° C. or higher in the lengthwise and crosswise directions so that the draw ratio in each direction becomes 3 or more. The high molecular weight polyethylene films obtained by this process, though being smooth and lustrous, have the maximum opacity of 15%, the maximum water vapor transmission of 0.6, and are not porous.

Japanese Patent L-O-P Publn. No. 39602/1988 discloses a process for the preparation of high molecular weight polyethylene films, characterized in that a gel-like product is prepared by mixing polyethylene having a molecular weight of 500,000 or higher with a nonvolatile solvent such as paraffin oil, the gel-like product is formed into a sheet after adjustment of the amount of the solvent present in said gel-like product to 80–95%, and the sheet is stretched at a temperature below 120° C. two times or more in monoaxial direction and biaxially stretched 10 times or more at an areal magnification, followed by removal of the solvent.

Japanese Patent L-O-P Publn. No. 255415/1985 describes high molecular weight polyethylene films composed of polyethylene having a viscosity-average molecular weight of 400,000 or higher and having a tensile strength of 0.25 GPa in every direction. This high molecular weight polyethylene film is prepared as a non-porous high-strength film by first forming a film from a mixture comprising a high molecular weight polyethylene and an aliphatic or alicyclic compound excellent in compatibility with said polyethylene, capable of being uniformly mixed therewith in a molten state, and capable of swelling or wetting the polyethylene, extracting said aliphatic or alicyclic compound from said film, and stretching the thus treated film at a temperature of 130°–150° C. and a stretch rate of 50%/sec. In this high molecular weight polyethylene film, it is designed that a decrease in mechanical strength as a non-porous high strength-film is prevented by stretching said polyethylene film at a specific stretch rate under application of heat as defined above, because when the aliphatic or alicyclic compound is extracted from the high molecular weight polyethylene film, the resulting film becomes a porous film, decreasing in strength.

The high molecular weight polyethylene films obtained by the processes as mentioned above, however, involved such problems that they are apt to undergo laminar separation, crease easily and poor in retention of shape thereof. Further, there were such problems that because of being poor in surface smoothness, the conventional biaxially oriented films of high molecular weight polyethylene sometimes cause blocking between them, stick to or twine round the machine parts at the contact portions thereof in the course of film forming operation.

In consideration of such prior art as mentioned above, the present inventors conducted extensive researches and, as the result, they have eventually found that biaxially oriented films of high molecular weight polyethylene excellent in surface smoothness and tensile strength and having gas permeability are obtained when a raw fabric sheet is formed from a blend of a high molecular weight polyethylene and a solvent or plasticizer, the solvent or plasticizer is removed from the raw sheet, and further the thus treated raw sheet is biaxially stretched to obtain a film, followed by heating under specific conditions. The present invention has been accomplished on the basis of the above findings.

Furthermore, an excellent affinity between the film surface of said biaxially oriented film and water is required according to the purpose for which this film is used. Surface of the biaxially oriented films of high molecular weight polyethylene may be hydrophylized in this case.

OBJECT OF THE INVENTION

The present invention has been made in light of such circumstances as mentioned above, and an object of the invention is to provide biaxially oriented films of high molecular weight polyethylene low in static coefficient of friction as well as in kinetic coefficient of friction, excellent in tensile strength, and having gas permeability, and a process for preparing the same, and surface-modified biaxially oriented films of high molecular weight polyethylene prepared by surface treatment of the above-mentioned biaxially oriented films of high molecular weight polyethylene so that the contact angle of the film surface to the water drop becomes not more than 90°, and a process for preparing the same.

SUMMARY OF THE INVENTION

The biaxially oriented films of high molecular weight polyethylene of the invention are characterized by having a nonwoven fabric-like gas permeable structure comprising microfibrils, being formed from a high molecular weight polyethylene having an intrinsic viscosity [η] of at least 5.0 dl/g, and having (i) an average pore diameter of 0.1–10 μm,
(ii) a void content of 20–70%,
(iii) a tensile modulus of not less than 0.6 GPa,
(iv) a tensile strength of not less than 0.1 GPa,
(v) a static coefficient of friction of not more than 1.0, and
(vi) a kinetic coefficient of friction of not more than 1.0.

In the biaxially oriented films of high molecular weight polyethylene having such characteristics as mentioned above, it is desirable that when an adhesive tape is adhered to the film having the same width as the adhesive tape and peeled off from the film in the 180° peeling method to make the interlaminar separation of the films occur, the interlaminar peeling strength is not less than 45 g/cm, provided that said adhesive tape has a peel strength of 300 g/cm when two of the adhesive tapes are adhered to each other at adherent surfaces and peeled off from each other according to the 180° peeling method. Furthermore, it is desirable that the biaxially oriented films have the number of Gurley seconds of 0.1–60 seconds, said number of Gurley seconds being defined by time (number of second) necessary for 10 ml of air to permeate through a film surface of 1 inch in diameter under the conditions of a pressure of 600 mm $H_2O$ and a temperature of 23° C., and have a pierce strength of not less than 20 g.

The process for preparing the biaxially oriented films of high molecular weight polyethylene of the present invention is characterized by;

(1) melt kneading together 20–75 parts by weight of a high molecular weight polyethylene [A] having an intrinsic viscosity [η] of at least 5.0 dl/g and 80–25 parts by weight of a hydrocarbon plasticizer [B] which is a solid at room temperature and capable of forming a homogeneous mixture, and forming a raw fabric sheet from the resulting molten mixture, (2) extracting said hydrocarbon plasticizer at a temperature of below 90° C. with a solvent [C] capable of dissolving said hydrocarbon plasticizer and removing the extracted hydrocarbon plasticizer [B] from said raw fabric sheet, thereby transforming said raw fabric sheet into an unstretched sheet in which substantially no hydrocarbon plasticizer [B] remains, (3) stretching said unstretched sheet at a temperature of less than 135° C. in the lengthwise direction at a stretch ratio of not less than 3 times and in the crosswise direction at a stretch ratio of not less than 3 times, thereby preparing a stretched film having a specific surface area of not less than 70 $m^2/g$ and a fibril structure, and (4) heating said stretched film at a temperature of 132°–145° C. for a period of 1 second to 10 minutes under a standard length constraint, thereby reducing the specific surface area of the unstretched film by 20 $m^2/g$ or more.

In the process for preparing biaxially oriented films of high molecular weight polyethylene according to the invention, it is preferable that the hydrocarbon plasticizer [B] to be used is a paraffin wax, and that the stretching temperature to be employed is 90°–130° C. and the stretch ratio employed is not less than 4 times in the lengthwise direction and not less than 4 times in a crosswise direction.

The surface-modified biaxially oriented films of high molecular weight polyethylene according to the invention are composed of a high molecular weight polyethylene having an intrinsic viscosity [η] of at least 5.0 dl/g and have
(i) an average pore diameter of 0.1–10 μm, (ii) a void content of 20–70%,
(iii) a tensile modulus of not less than 0.6 GPa,
(iv) a tensile strength of not less than 0.1 GPa,
(v) a static coefficient of friction of not more than 1.0,
(vi) a kinetic coefficient of friction of not more than 1.0, and
(vii) a contact angle of the film surface to the water drop of not more than 90°, and
a nonwoven fabric-like permeable structure.

The surface modified biaxially oriented films of high molecular weight polyethylene as illustrated above may be prepared by subjecting the surface of the biaxially oriented films of high molecular weight polyethylene obtained as above to surface treatment by means of one procedure selected from the group consisting of corona discharge treatment, plasma discharge treatment and electron radiation treatment, and thereby making the contact angle of the film surface to the water drop come to be at a level of not more than 90°.

Further, the surface modified biaxially oriented films of high molecular weight polyethylene as mentioned above may also be prepared by polymerizing a vinyl monomer having a hydrophilic group on the surface of the biaxially oriented films of high molecular weight polyethylene obtained as above, and thereby making the contact angle of the film surface to the water drop come to be at a level of not more than 90°.

The biaxially oriented films of high molecular weight polyethylene of the present invention have gas permeability and also are excellent in tensile strength and surface smoothness.

Further, the surface-modified biaxially oriented films of high molecular weight polyethylene of the invention have gas permeability, excellent in tensile strength and surface smoothness and excellent also in affinity for water.

DETAILED DESCRIPTION OF THE INVENTION

Illustrated below in detail are the biaxially oriented films of high molecular weight polyethylene of the present invention and processes for preparing the same, and the surface modified biaxially oriented films of high molecular weight polyethylene films of the invention and processes for preparing the same.

Biaxially Oriented Film of High Molecular Weight Polyethylene

First of all, the biaxially oriented films of high molecular weight polyethylene of the invention are illustrated.

The biaxially oriented films of high molecular weight polyethylene of the invention are composed of a high molecular weight polyethylene having an intrinsic viscosity $[\eta]$ of not less than 5.0 dl/g, preferably 10–30 dl/g, and have a nonwoven fabric-like structure made of microfibrils which are the smallest constituent unit of the crystal of polyethylene.

In the sense of polyethylene filament, it is thought that the microfibril as referred to herein is basically identical with what has been reported by Peterlin [Colloid and Polymer Science, Vol. 253, 809 (1975)], and said microfibril is a crystalline fiber of about 10–20 nm in width. The structure of microfibril or film may be confirmed by observing a gold-metallized test specimen by means of a scanning type electron microscope at magnifications of about 10,000–30,000.

Figure 1:
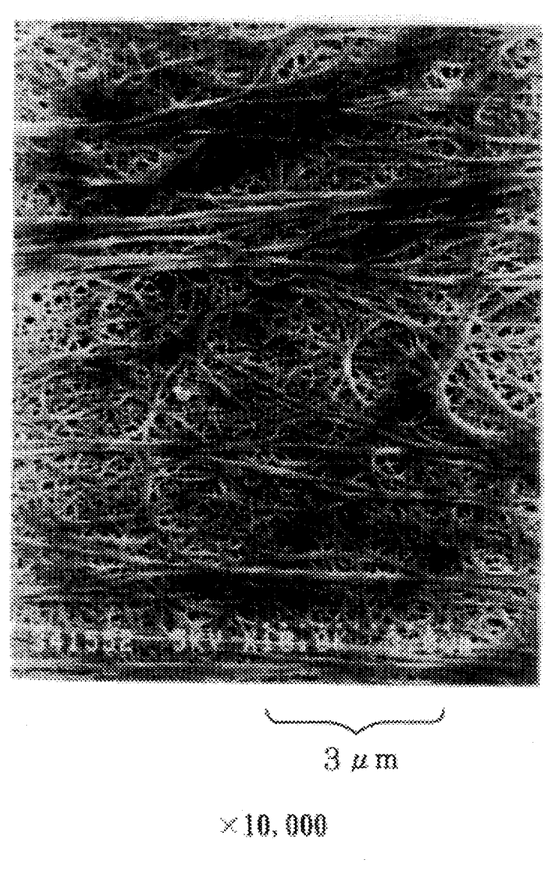
FIG. 1 is a scanning type electron photomicrograph of the biaxially oriented film of high molecular weight polyethylene according to the present invention.

FIG. 1 shows a scanning type electron photomicrograph of the biaxially oriented film of the invention, and as can be seen therefrom, this microfibril has a so-called leaf vein-like structure.

The biaxially oriented films of high molecular weight polyethylene of the invention are translucent films or films of white luster, and have a light transmittance of not more than 10%, preferably not more than 10%, though it depends on the thickness of film.

The light transmittance may be measured by means of a haze meter (for example, such as instrument as ND-H67A manufactured by Nippon Denshoku K.K.) in accordance with ASTM D-1003-69 or JIS K-6714.

The biaxially oriented films of high molecular weight polyethylene of the invention as illustrated above desirably have an average pore diameter of 0.1–10 µm, preferably 0.1–1.0 µm.

This average pore diameter may be obtained by observation of the film under a scanning type electron microscope.

The porosity of the film is 20–70%, preferably 30–60%.

The porosity was obtained on the basis of the following equation wherein the thickness of a biaxially oriented film of high molecular weight polyethylene is taken as T1, and the film thickness of said biaxially oriented film, when being assumed to be a dense film (the porosity is 0%), is taken as T2 (a value obtained on the basis of the density of the high molecular polyethylene taken as 0.96 g/cm$^3$).

$$\text{Porosity } (\%) = (T1-T2)/T1 \times 100$$

The biaxially oriented films of high molecular weight polyethylene of the invention have pores, some of them penetrate through the film, and others do not penetrate therethrough.

The films of the invention desirably have a modulus in tensile of 0.6 GPa or more, preferably 1.2 GPa or more in every direction.

The modulus in tensile (tensile modulus) as referred to in the invention is a tangent modulus.

The films of the invention desirably have a tensile strength of 0.1 GPa or more, preferably 0.15 GPa or more and especially 0.3 GPa or more in every direction.

Further, the films of the invention desirably have a breaking extension of 15% or more, preferably 30% or more and especially 50% or more in every direction.

The modulus in tension and tensile strength were determined at room temperature (23° C.) using a tensile tester manufactured and sold by Orientec K.K. under a trade name of Tensilon (Model RTM 100). The test specimen used in the above test is dumbell-shaped specimen of JIS No. 1, the distance between the clamps is 115 mm, and the crosshead speed is 20 mm/min. The sectional area of the specimen necessary for the calculation was obtained from a thickness and width of the specimen.

The film thickness was measured by means of a film gage tester of Miniaxe type DH-150 manufactured and sold by Tokyo Seimitsu K.K.

The films of the invention desirably have a coefficient of static friction of not more than 1.0, preferably not more than 0.7, and a coefficient of kinetic friction of not more than 1.0, preferably not more than 0.7.

The measurement of coefficient of friction was conducted in accordance with the method specified in ASTM D1894-63. That is, the coefficient of kinetic friction and coefficient of static friction were calculated on the basis of resistance as determined between two films brought into contact with each other and rubbed with each other under a definite load.

Because of their small coefficient of static friction and small coefficient of kinetic friction, the biaxially oriented films of the invention are excellent in surface smoothness, and it is rare to produce blocking between the films. Further, it is difficult to bring about such a problem that the blocking is produced at the time when the film as formed is wound up on a wind-up roll, and it is possible to lessen the occurrence of such a problem that at the time of continuously transporting the film as formed by means of a roll, said film sticks to or twines around the machine parts of said roll at a contact portion.

The biaxially oriented films of high molecular weight polyethylene of the invention desirably have an interlaminar peeling strength of not less than 45 g/cm, preferably not less than 50 g/cm, as measured when said biaxially oriented film is applied to and peeled off from an adhesive tape according to the 180° peeling method to make the interlaminar separation occur, said adhesive tape having a peeling strength of 300 g/cm as measured by adhering two adhesive tapes to each other at adherent surfaces thereof and then peeled off from each other according to the 180° peeling method, and said biaxially oriented film having the same width as that of said adhesive tape.

The peel strength of the adhesive tape was taken as an average value of the peel strength obtained, according to the 180° peeling method, by applying adhesive surfaces of two adhesive tapes to each other and then peeled off from each other according to the 180° peeling method, said average value being an average value of peel strength of said tape measured during from a point at which said tape has been peeled off from each other for a distance of 10 mm to a point at which said tape has been peeled, further, for a distance of 30 mm.

The interlaminar peeling strength of the biaxially oriented film of high molecular weight polyethylene was taken as a force measured by applying an adhesive tape and said biaxially oriented film having the same width as that of said tape to each other and then peeling, according to the 180° peeling method, said tape and said film off from each other, to occur the interlaminar separation of said film.

The interlaminar peeling strength was measured at room temperature (23° C.) and a crosshead speed of 30 mm/min using a cellophane adhesive tape having a width of 24 mm and an adhesive force of 300 g/cm (Cellotape® LP24, a product of Nichiban K.K.) and a Tensilon tension tester (manufactured and sold by Orientec K.K.)

Such biaxially oriented films of high molecular weight polyethylene as illustrated above are excellent in resistance to interlaminar release properties.

The biaxially oriented films of high molecular weight polyethylene according to the invention desirably have a number of Gurley seconds of 0.1–60 seconds, preferably 0.5–30 seconds and especially 1–15 seconds.

The gas permeability as referred to in the invention may be evaluated, according to JIS P8111, JIS P8117, TAPPI T479Sm-48 add ASTM D726-58, by means of a Gurley densitometer (for example, B type Gurley densitometer No. 158 manufactured and sold by Toyoseiki Seisakusho K.K.). In the present specification, the time (the number of seconds) required for the air of 10 ml to pass through the film surface of 1 inch in diameter at a pressure of 600 mmH$_2$O and a temperature of 23° C., as measured according to the above-mentioned method, is defined as a number of Gurley seconds.

In the invention, the films having a number of Gurley seconds of not less than 180 seconds are termed the blocked films, that is, dense and impermeable films.

The biaxially oriented films of high molecular weight polyethylene of the invention desirably have a piercing strength of not less than 20 g, preferably not less than 30 g.

This piercing strength was measured at room temperature (23° C.) and a crosshead speed of 50 mm/min using a Tensilon tensile tester (manufactured and sold by Orientec K.K.). The needle used in this test was a sleeve blind stitch needle having a diameter of the needle point of 30 μm.

The specific surface area of the biaxially oriented films of high molecular weight polyethylene of the invention is desirably 30–100 m$^2$/g, preferably 50–80 m$^2$/g.

If this specific surface area is less than 30 m$^2$/g, a favorable gas permeability is sometimes unobtainable, and if said specific surface area exceeds 100 m$^2$/g, the surface smoothness and resistance to interlaminar peeling of the film are often found poor.

The measurement of the specific surface area of the film may be carried out by means of a mercury injection type porosimeter (e.g. Autoscan-33 Porosimeter, a trade name of a product of Yuasa Ionics K.K.).

The degree of orientation determined by X-ray diffraction of the biaxially oriented films of high molecular weight polyethylene of the invention is desirably not less than 0.75, preferably not less than 0.80. The crystallinity index of said films is not less than 60%, preferably not less than 65%.

The degree of orientation of the biaxially oriented films of high molecular weight polyethylene may be determined by a method utilizing a half value width H° of a peak of strength distribution curve obtained by X-ray diffraction, and the value of said degree of orientation may be defined by the following equation.

$$\text{Degree of orientation } F=(90°-H°/2)/90°$$

This method is described in detail by Y. Go and K. Kubo in Journal of Industrial Chemical, Vol. 39, 929 (1939), and is a widely used method in practice, wherein a half value width of the strength distribution curve along Debye ring of the strongest paratroop surface on the equatorial plane is utilized.

The measurement of the crystallinity index may be carried out by known methods such as a method wherein the density of the film is measured by the density gradient method to obtain a theoretical crystal density and a theoretical amorphous density, and the crystallinity index is obtained therefrom by conversion, and a method wherein an amorphous halo obtained by X-ray diffraction of the film is utilized.

The film thickness of the biaxially stretched films of the invention having such physical properties as defined above, though it is elected suitably according to the purpose for which they are used, is usually not more than 500 μm, preferably 100–10 μm and especially 50–10 μm.

The term "film" or "films" as used in the invention is intended to include tapes having its length extremely longer than its width (so-called films in continuous lengths).

Process for Preparing Biaxially Oriented Films of High Molecular Weight Polyethylene The process for preparing the biaxially stretched films of high molecular weight polyethylene according to the invention is illustrated hereinafter.

In the process for preparing biaxially oriented films of high molecular weight polyethylene according to the invention, (1) 20–75 parts by weight of a high molecular weight polyethylene [A] having an intrinsic viscosity [η] of not less than 5.0 dl/g and 80–25 parts by weight of a hydrocarbon plasticizer [B] capable of producing a homogeneous mixture with said high molecular weight polyethylene are melted and kneaded together to obtain a molten mixture, and a raw fabric sheet is formed therefrom, (2) said hydrocarbon plasticizer [B] is removed by extraction from said raw fabric sheet at a temperature of not more than 90° C. using a solvent capable of dissolving said hydrocarbon plasticizer [B] to obtain an unstretched sheet containing practically no residual hydrocarbon plasticizer, (3) said unstretched sheet is stretched at a temperature of less than 135° C. so that the draw ratio both in the lengthwise and crosswise directions becomes not less than 3 times to obtain a stretched film having a specific surface area of not less than 70 m$^2$/g and a fibril structure, and (4) said stretched film is heated under standard length constraint at a temperature of 132°–145° C. for 1 second to 10 minutes to reduce the specific surface area of said stretched film by not less than 20 m$^2$/g, whereby the desired biaxially oriented film of high molecular weight is prepared.

Preparation of Raw Fabric Sheet

In the invention, the high molecular weight polyethylene [A] having an intrinsic viscosity [η] of at least 5.0 dl/g and the hydrocarbon plasticizer [B] are melt kneaded to obtain a molten mixture, and from the molten mixture a raw fabric sheet is prepared.

The high molecular weight polyethylene [A] used in the invention has an intrinsic viscosity [η], as measured at 135° C. in decalin, of not less than 5.0 dl/g, preferably 10–30 dl/g. If the said polyethylene [A] has an intrinsic viscosity [η] of less than 5.0 dl/g, there are some cases where a film having a high tensile strength is not obtained, and if, on the other hand, said intrinsic viscosity [η] exceeds 30 dl/g, there are some cases where it becomes difficult to prepare a homogeneous mixture with the hydrocarbon plasticizer [B] and, moreover, the melt viscosity of the resulting mixture increases and hence the resulting mixture as intended for becomes sometimes poor in moldability.

The high molecular weight polyethylene as illustrated above may be obtained by (co)polymerization in the presence of a Ziegler catalyst of ethylene or ethylene and α-olefin of 3–9 carbons. The α-olefin of 3–9 carbon atoms used herein includes propylene, 1-butene, 1-pentene, 4-methyl-1-pentene, 1-hexene and 1-butene. Among these α-olefins, preferred are propylene and 1-butene. The high molecular weight polyethylene desirably contains the structural unit derived from the α-olefin of 3–9 carbon atoms in an amount of not more than 5% by weight.

The high molecular weight polyethylene [A] used in the invention may contain various additives commonly used in preparing polyolefins, such as heat stabilizers, weathering stabilizers, lubricants, anti-blocking agents, slip agents, pigments, dyes, inorganic fillers and the like to such an extent that nothing mars the accomplishment of the object of the invention.

The hydrocarbon plasticizer [B] desirably has a boiling point higher than the melting point of the high molecular weight polyethylene [A], and the former is preferably higher by 10° C. than the latter. In this connection, the melting point of the hydrocarbon plasticizer [B] is preferably not more than 110° C.

The hydrocarbon plasticizer [B] as mentioned above preferably includes those having a molecular weight of not more than 2,000 and being solid at room temperature. Of these hydrocarbon plasticizers, especially preferred are paraffin waxes having a molecular weight of from 400 to 1,000. The hydrocarbon plasticizer being solid at room temperature and having a molecular weight of not more than 2,000 gives a homogeneous mixture when melt kneaded at a temperature above 110° C. with the high molecular weight polyethylene [A]. In this connection, the paraffin waxes having a molecular weight of 400–1,000 are excellent in dispersibility at the time when melt kneaded with the high molecular weight polyethylene [A].

The paraffin waxes include n-alkanes having not less than 22 carbons such as docosane, tricosane, tetracosane and triacontane, or mixtures of lower n-alkanes containing the above-mentioned n-alkanes as main ingredients; the so-called paraffin waxes formed by separation from petroleum; low molecular weight polymers of ethylene or copolymers of ethylene and α-olefin of 3 or more carbon atoms such as medium low pressure polyethylene, high pressure polyethylene waxes and ethylene copolymer waxes; and waxes obtained by reducing molecular weight of polyethylenes such as medium low pressure polyethylenes and high pressure polyethylene by heat degradation, and oxidized or modified waxes such as oxidation products or modification products of the above-mentioned waxes.

The raw fabric sheet is prepared by melt kneading 20–75 parts by weight, preferably 20–50 parts by weight and especially 20–40 parts by weight of the high molecular weight polyethylene [A] together with 80–25 parts by weight, preferably 80–50 parts by weight and especially 80–60 parts by weight of the hydrocarbon plasticizer [B], and forming the resulting molten product into a sheet, followed by cooling to solidify.

The high molecular weight polyethylene [A] and the hydrocarbon plasticizer [B] may be melt kneaded by kneading with a kneading device, e.g., a Henschel mixer, V-blender, ribbon blender or tumbler blender, followed by melt kneading by means of a screw extruder such as a single screw extruder or twin-screw extruder, or by means of a kneader or Banbury mixer. The melt kneading temperature employed in that case is usually higher than the melting point of the high molecular weight polyethylene [A], and the temperature is not more than 300° C., preferably 160°–250° C. If the melt kneading temperature employed is lower than the melting point of the high molecular weight polyethylene, the resulting kneaded product increases in viscosity and hence there is a case wherein no homogeneous kneading can be performed. When the melt kneading is carried out at a temperature above 300° C., the high molecular weight polyethylene [A] sometimes undergoes heat deterioration.

The resulting mixture of the high molecular weight polyethylene [A] and the hydrocarbon plasticizer [B] may be formed into a raw fabric sheet by means of the extrusion technique using an extruder equipped with a T-die or by means of the compression molding.

When the raw fabric sheet is formed by the extrusion technique, there may be employed a continuous method wherein the raw sheet is extruded through the T-die while the mixture is melt kneaded by means of a screw extruder.

When the raw sheet is formed by means of the compression molding, the melt kneading of the mixture is carried out separately in advance, and the molten mixture obtained is then formed into a sheet-like shape by means of the compression molding.

The thickness of the raw sheet is desirably 0.05–5 mm, because said sheet is nipped at the time of the stretching thereof by means of a tenter clip.

In the present specification, the melting point is represented by a value measured according to ASTM D3417 with a differential scanning calorimeter (DSC) unless otherwise specified.

Extraction of Hydrocarbon Plasticizer [B]

Subsequently, the hydrocarbon plasticizer [B] is extracted with a solvent [C] capable of dissolving said plasticizer [B]

from the raw fabric sheet and removed therefrom at a temperature of 90° C., preferably at a temperature of 80° C. to obtain an unstretched sheet containing substantially no hydrocarbon plasticizer [B].

Useful in the invention as the solvent [C] capable of extracting and removing the hydrocarbon plasticizer from the raw fabric sheet is a low molecular weight hydrocarbon solvent such as n-hexane, cyclohexane, n-heptane, n-octane, n-decane or n-dodecane.

The extraction and removal of the hydrocarbon plasticizer [B] from the raw fabric sheet is carried out desirably at a temperature above a melting point of the hydrocarbon plasticizer [B] if said plasticizer has a melting point. By carrying out the extraction and removal of the hydrocarbon plasticizer [B] from the raw sheet at a melting point of said plasticizer, the time required therefor can be shortened. In this connection, the upper limit of the treatment time of the extraction and removal of the hydrocarbon plasticizer is the softening point of the raw sheet. The softening point of the raw sheet is usually about 90° C., though it more or less varies depending upon the kind of the hydrocarbon plasticizer used, or upon the blending proportion of the high molecular weight polyethylene [A] and the hydrocarbon plasticizer [B]. If the extraction and removal operation is carried out at a temperature higher than the softening point of the raw sheet for a long period of time, an excellent structure suitable for the biaxial stretchability of the raw sheet sometimes undergoes change, said structure being formed by the crystallization of the high molecular weight polyethylene in the presence of the hydrocarbon plasticizer [B].

It is desirable to carry out the extraction and removal of the hydrocarbon plasticizer [B] from the raw fabric sheet in a constrained state (fixed end). If the extraction and removal of the said plasticizer is carried out in an unconstrained state (free end), the unstretched sheet (raw sheet) tends to warp or crease, whereby it often troublesome to fit the unstretched sheet with a tenter. When the extraction and removal of the hydrocarbon plasticizer [B] is carried out in the unconstrained state (free end), the raw sheet undergoes contraction. However, no stretching characteristics of the sheet are marred, if said contraction is up to 30% in terms of the specific surface area.

By the unstretched sheet containing substantially no residual hydrocarbon plasticizer as referred to in the invention is meant that the content in said unstretched sheet of the hydrocarbon plasticizer [B] after the extraction and removal thereof is not more than 5% by weight based on the weight of said unstretched sheet.

The presence of the hydrocarbon plasticizer [B] remaining in the unstretched sheet after the extraction and removal treatment may be confirmed by means of a differential scanning calorimeter (DSC) if said hydrocarbon plasticizer [B] is of a crystalline structure. Besides, the same confirmation may be accomplished by using a Soxhlet's extractor, wherein the unstretched sheet is treated with a suitable solvent incapable of dissolving the high molecular weight polyethylene but capable of dissolving the hydrocarbon plasticizer [B], for example, boiling n-hexane, when said hydrocarbon plasticizer is paraffin wax, and a loss in weight of the thus treated unstretched sheet is obtained to confirm whether the hydrocarbon plasticizer [B] still remains in said sheet or not.

Stretching

Subsequently, the above-mentioned unstretched sheet is stretched at a temperature below 135° C. so that the stretch ratio in the lengthwise direction becomes 3 times or more and that in crosswise direction becomes 3 times or more, thereby obtaining a stretched film (biaxially oriented film) having a specific surface area of not less than 70 m²/g and a fibril structure.

The temperature at which the unstretched sheet is stretched is not less than 60° C. and less than 135° C., preferably 90°–130° C. If this temperature is not more than 60° C., it becomes difficult to stretch the unstretched sheet to the stretch ratio of three times or more, because the stretching stress of said sheet becomes larger, and there is sometimes a case wherein the stretched film obtained does not exhibit a high modulus of elasticity and high strength. If the stretching temperature employed exceeds 135° C., there is sometimes a case wherein the stretched film becomes a non-porous, dense and gas-impermeable film and does not have a nonwoven fabric-like gas permeable structure.

The stretch ratio to be employed in that case is 3 times or more, preferably 4 times or more, further preferably 5–20 times and especially 6–20 times in the lengthwise direction, and 3 times or more, preferably 4 times or more, further preferably 5–20 times and especially 6–20 times in the crosswise direction.

When an ultra-thin (film thickness of not more than 1 μm) stretched film is prepared, it is desirable to employ the stretch ratio of 20 times or more in the lengthwise direction as well as in the crosswise direction. If the stretch ratio exceeds 20 times, the thickness of the resulting stretched film becomes usually 1/400 or less of that of the raw fabric sheet, though the thickness varies depending on the porosity of the stretched film and on the composition of the raw sheet.

The process for stretching the aforementioned unstretched sheet includes a simultaneous or successive biaxial stretching according to the tentering method, or a successive biaxial stretching process comprising a combination of the stretching by a roll in the lengthwise direction and the stretching by a tenter in the crosswise direction. When the stretch ratio in the lengthwise direction is 6 times or more, the stretching in the lengthwise direction is preferably carried out by a multi-stage stretching technique. When the multi-stage stretching technique is employed, the stretching temperature to be employed is preferably allowed to rise as the stretching proceeds from the forward stage to the backward stage within the temperature range not exceeding 135° C.

The stretched film thus obtained assumes an opaque or translucent white. The light transmittance of this film, though it depends on the thickness of the film, is not more than 10%, preferably not more than 5%. This stretched film has an unwoven fabric-like structure of microfibrils which are the minimal structural units of polyethylene.

The stretched film desirably has a specific surface area of 70 m²/g or more, preferably 90 m²/g. If the specific surface area is not more than 70 m²/g, there are some cases where the stretched film, when heated, loses its gas permeability or fails to exhibit physical properties such as tensile strength.

The stretched film obtained by way of such stretching processes as mentioned above desirably has a porosity of 35–80%. Furthermore, the tensile strength in all directions 0.1 GPa or more, preferably 0.2 GPa or more, and the tensile modulus is 0.5 GPa or more, preferably 1.0 GPa or more in all directions. Still further, the elongation at breakage of the stretched film is 15% or more, preferably 30% or more and especially 50% or more.

This stretched film has the coefficient of static friction of usually 1.5 or more, and the coefficient of kinetic friction of usually 1.5 or more.

The interlaminar peel strength as measured by the 180° peeling method is not more than 30 g/cm when an adhesive tape having a peel strength of 300 g/cm as measured by the 180° peeling method, said peel strength being measured by peeling off two adhesive tapes having been adhered to each other on their adherent surfaces according to the 180° peeling method, is adhered to the surface of the biaxially oriented film of high molecular weight polyethylene having the same width as that of the adhesive tape and peeled off therefrom.

The number of Gurley seconds is 0.1–60 seconds, preferably 0.5–30 seconds especially 1–15 seconds.

The piercing strength is usually 30–60 g.

The degree of orientation obtained by X-ray diffraction of the stretched film is 0.75 or more, preferably 0.80 or more in all directions on the film surface, and the degree of crystallinity is 55% or more, preferably 65% or more.

The thickness of the stretched film is usually 500 μm or less, preferably 100–10 μm, though it may be suitably decided according to the purpose for which the stretched film is used.

Heat Treatment

Subsequently, the thus obtained stretched film is heated under a standard length constraint at a temperature of 132°–145° C. for 1 second to 10 minutes to reduce the specific surface area of said stretched film by 20 m$^2$/g or more, whereby preparing a biaxially oriented film of high molecular weight polyethylene. The thus prepared biaxially oriented film of high molecular weight polyethylene has such characteristics as mentioned above.

By standard length constraint as used in the invention is meant such a state wherein the film is not substantially contracted nor expanded both in lengthwise and crosswise directions. However, the contraction up to about 10% in both lengthwise and crosswise directions is allowed at the time of heat treatment of the stretched film.

A heat medium for heating the stretched film includes such gases as air and nitrogen gas; and such liquids which do not dissolve or modify polyethylene films, for example, as water, diethylene glycol and triethylene glycol.

The stretched film is heated desirably under such conditions that the specific surface area of said stretched film is reduced by 20 m$^2$/g or more, preferably 20–30 m$^2$/g, and also that the specific surface area of the biaxially oriented film of high molecular weight polyethylene obtained after heat treatment becomes 30–100 m$^2$/g.

If the reduction in specific surface area of the resulting biaxially oriented film of high molecular weight polyethylene is less than 20 m$^2$/g, said film sometimes becomes poor in physical properties such as resistance to stratiform separation and surface smoothness. If the specific surface area of the resulting biaxially oriented film of high molecular weight polyethylene is less than 30 m$^2$/g, no biaxially oriented film of high molecular weight polyethylene is obtained.

The temperature employed for heating the stretched film is usually 132°–145° C., preferably 132–142 and especially 135°–140° C., and the heating time is 1 second to 10 minutes, preferably 1 second to 60 seconds. When heat treated at a temperature of less than 132° C., the stretched film treated thereat sometimes is not improved in physical properties. On the other hand, if the stretched film is heat treated at a temperature exceeding 145° C., there are some cases wherein the treated stretched film loses its nonwoven fabric-like structure and gas permeability, and is transparentized.

Such heat treatment of the stretched films mentioned above may be carried out under substantially the standard length constraint at a temperature of 132°–145° C. in succession to the stretching step, or may be carried out under the standard length constraint at a temperature of 132°–145° C. after cooling the stretched film once to a temperature of not more than 60° C.

As the result of such heat treatment of the stretched film as mentioned above, the bulk density of the resulting biaxially oriented film of high molecular weight polyethylene decreases a little than that of the stretched film prior to the heat treatment, and the film thickness of said biaxially oriented film becomes thinner. However, the resulting biaxially oriented film of high molecular weight polyethylene is improved in tensile strength by about 30% or more in comparison with that of said film prior to the heat treatment.

By heating the stretched film under a standard length constraint and specific conditions as mentioned above, there can be obtained a biaxially oriented film of high molecular weight polyethylene having decreased coefficient of static friction and kinetic friction and improved resistance to stratiform separation and self-form retentivity, while maintaining the nonwoven fabric-like structure and gas permeability resulting from the aforesaid stretching step.

In the biaxially oriented film of high molecular weight polyethylene as illustrated above, a contact angle to water is usually 110° or more. According to the purpose for which the film is used, however, said film must have an affinity for water, and in such a case, the affinity for water can be improved by such a method as mentioned below.

[Surface-modified biaxially oriented film of high molecular weight polyethylene and process for the preparation thereof]

The surface-modified biaxially oriented film of high molecular weight polyethylene of the invention and a process for the preparation thereof are illustrated hereinafter.

The surface-modified biaxially oriented film of high molecular weight polyethylene according to the invention comprising a high molecular weight polyethylene having an intrinsic viscosity [η] of at least not less than 5.0 dl/g, in which (i) an average pore diameter of 0.1–10 μm,
(ii) a void content of 20–70%,
(iii) a tensile modulus is not less than 0.6 GPa,
(iv) a tensile strength is not less than 0.1 GPa,
(v) a coefficient of static friction is not more than 1.0,
(vi) a coefficient of kinetic friction is not more than 1.0, and
(vii) a contact angle of the film surface to the water drop is not more than 90°, and has a nonwoven fabric-like and gas permeable structure of microfibrils.

The surface-modified biaxially oriented film of high molecular weight polyethylene of the invention has the same characteristics as in the aforesaid biaxially oriented film of high molecular weight polyethylene of the invention and is excellent also in affinity for water. The affinity for water may be represented by means of a contact angle utilizing a surface tension of water, and the contact angle to the water of this surface-modified biaxially oriented film of high molecular weight polyethylene is not more than 90°, preferably not more than 80° and especially not more than 70°.

The measurement of contact angle to water may be carried out, for example, by means of an automatic contact angle meter of CA-Z Model manufactured and sold by Kyowa Kaimen Kagaku K.K.

The surface-modified biaxially oriented film of high molecular weight polyethylene as illustrated above may be prepared by subjecting the aforesaid biaxially oriented film of high molecular weight polyethylene of the invention to surface treatment such as corona discharge treatment, plasma discharge treatment or electron radiation treatment, or polymerizing a vinyl monomer having a hydrophilic group on the surface of said biaxially oriented film.

The methods for polymerizing a vinyl monomer having a hydrophilic group on the surface of the biaxially oriented film to obtain the surface-modified biaxially oriented film of high molecular weight polyethylene include a method comprising applying the vinyl monomer having the hydrophilic group on the surface of the biaxially oriented film and then carrying out an electron ray irradiation thereon.

Concrete examples of the vinyl monomer having a hydrophilic group include unsaturated carboxylic acids such as acrylic acid and methacrylic acid; carboxylic acid vinyl esters such as vinyl acetate; and mixtures thereof.

EFFECT OF THE INVENTION

The biaxially oriented films of high molecular weight polyethylene of the invention are excellent in tensile modulus of elasticity and tensile strength, low in coefficients of static and kinetic friction, and excellent in resistance to interlaminar separation and piercing strength and also in gas permeability.

The surface modified biaxially oriented films of high molecular weight polyethylene of the invention may be obtained by imparting affinity for water to the above-mentioned biaxially oriented films of high molecular weight of polyethylene.

The biaxially oriented films of high molecular weight polyethylene and surface-modified biaxially oriented films of high molecular weight polyethylene of the invention as illustrated above may be used each singly or as a laminated film composed of a plurality of homogeneous films, or may be used in lamination with films of various kinds of resins including polyethylene, paper, cellophane or aluminum foil.

Concretely, these films of two types according to the invention may be used, for example, as a support of useful filter for separating ultrafine particle materials from various liquids containing the same, or separating filters. Further, they can be used as condenser film, insulating paper or battery separator. Furthermore, they can be used, making the best use of their high strength, light weight properties, water resistance and good printability, as outdoor displaying print paper, various kinds of packaging materials, especially air mail envelop and packaging materials. Furthermore, utilizing their gas permeability, they can be used as packaging materials for moisture or oxygen absorbers.

The present invention is illustrated below in more detail with reference to examples, but it should be construed that the invention is in no way limited to those example.

In the following examples, "parts" and "%" are individually "parts by weight" and "% by weight" unless otherwise stated.

EXAMPLE 1

A particulate mixture obtained by mixing uniformly together 30 parts by weight of a particulate high molecular weight polyethylene (intrinsic viscosity [η]=16 dl/g), 70 parts by weight of particulate paraffin wax (m.p.=69° C., molecular weight 460) and 0.5%, based on the high molecular weight polyethylene, of 3,4-di-tert-butyl-4-hydroxytoluene as a process stabilizer was melt kneaded by means of a twin screw-type melt kneading machine Laboplastomill (20R-200 Model of Toyo Seiki Seisakusho) at 190° C. for 10 minutes to obtain a uniform molten mixture. In that case, the number of revolutions of the screws was 50 r.p.m.

This molten mixture was separated in the molten state, placed, as it was, between a pair of press plates, adjusted in thickness by means of a metal frame, and immediately thereafter put between hot plates of a hot press preset at 190° C., whereby the molten mixture was processed into a sheet form. After 5-minute compression by means of the hot press, the molten mixture held between the press plates was compressed by means of a cold press adjusted to 20° C., cooled and solidified to obtain a raw fabric sheet of about 1 mm in thickness.

Subsequently, in order to prevent contraction, the raw fabric sheet was fixed by means of a pair of metal frames wherein said raw fabric sheet was held, and allowed to stand for about 2 hours in a bath of n-decane kept at 60° C., whereby the paraffin wax was extracted and removed from said raw sheet. In that case, the n-decane was stirred in order to facilitate the extraction and removal of the paraffin wax.

After that, the unstretched sheet held between the metal frames was dried under reduced pressure at room temperature (23° C.). The thus dried unstretched sheet observed by means of a differential scanning calorimeter (DSC), whereupon no melting point of the paraffin wax at 69° C. was recognized.

Subsequently, the unstretched sheet thus dried was subjected to simultaneous biaxial stretching (length×breadth: 6×6) at a stretching temperature of 120° C. to obtain a stretched film (sample No. 1) of 14.8 μm in thickness. In that case, there was used a tentering type biaxial stretching machine of Heavy Model of Toyo Seiki Seisakusho K.K.

The thus obtained stretched film (sample No. 1) was fixed by means of a metal frames so that said film will not contract, and heated, under such a standard length constraint, for 10 minutes by means of an air oven preset to a temperature of 140° C. to obtain a biaxially oriented film of high molecular weight polyethylene (sample No. 2).

Results obtained are shown in Table 1.

EXAMPLE 2

A stretched film of 11.5 μm in thickness (sample No. 3) was obtained by repeating Example 1 except that a high molecular weight polyethylene having an intrinsic viscosity [η] of 8.4 dl/g was used in place of the high molecular weight polyethylene used in said Example 1.

Subsequently, the thus obtained stretched film (sample No. 3) was heated, under a standard length constraint, for 10 minutes by means of an air oven preset to a temperature of 140° C. to obtain a biaxially oriented film of high molecular weight polyethylene (sample No. 4).

Results obtained are shown in Table 1.

TABLE 1

|  | Example 1 | | Example 2 | |
| --- | --- | --- | --- | --- |
| Sample No. | 1 | 2 | 3 | 4 |
| Sample No. of test material to be heat treated | 1 | 1 | 3 | 3 |
| Presence of heat treatment | No | Yes | No | Yes |
| Tensile strength (GPa) | 0.34 | 0.62 | 0.08 | 0.13 |
| Tensile modulus of elasticity (GPa) | 1.66 | 2.95 | 1.20 | 2.37 |
| Elongation at failure (%) | 73 | 73 | 8 | 26 |

TABLE 1-continued

|  | Example 1 | | Example 2 | |
|---|---|---|---|---|
| Sample No. | 1 | 2 | 3 | 4 |
| Porosity (%) | 59 | 39 | 40 | 37 |
| Number of Gurley seconds (Second) | 3.8 | 8.4 | 5.3 | 16.2 |
| Piercing strength (g) | 52.0 | 49.2 | 30.7 | 36.3 |
| Specific surface area ($m^2$/g) | 78 | 51 | 82 | 57 |
| Coefficient of kinetic friction | 1.75 | 0.41 | 1.65 | 0.47 |
| Coefficient of static friction | 2.29 | 0.43 | 2.37 | 0.51 |
| Interlaminar peeling strength (g/cm) | 27.3 | 65.3 | 26.2 | 60.3 |
| Average pore diameter (μm) | 0.6 | 0.3 | 0.7 | 0.4 |

EXAMPLE 3

The biaxially oriented film of high molecular weight polyethylene (sample No. 2) obtained in Example 1 was subjected to surface treatment in the manner as described below.

The biaxially oriented film of high molecular weight polyethylene (sample No. 2) was immersed in glacial acrylic acid (special grade reagent of Wako Junyaku K.K.), whereupon the immersed film (sample No. 2) became translucent.

Successively, the resulting translucent and biaxially stretched film of high molecular weight polyethylene (sample No. 2) was air dried until it became white, and the thus dried film was then irradiated with electron rays to obtain a surface-modified biaxially oriented film of high molecular weight polyethylene (sample No. 5).

The irradiation of said dried film with the electron rays was carried out using an electron ray irradiating apparatus (Curetoron Type TBC 200-20-10 of Nisshin High Voltage K.K.) at a room temperature (23° C.) in a nitrogen atmosphere. The irradiation conditions employed in that case included an accelerating voltage of 200 KV and an irradiation dose of 3 Mrad.

The amount of the glacial acrylic acid coated was obtained from the weight of the film measured after the irradiation with electron rays.

Results obtained are shown in Table 2.

EXAMPLE 4

A surface-modified biaxially oriented film of high molecular weight polyethylene (sample No. 6) was obtained by repeating Example 3 except that the biaxially oriented film of high molecular weight polyethylene (sample No. 4) obtained in Example 2 was used in place of the film (sample No. 2) used in said Sample 3.

Results obtained are shown in Table 2.

EXAMPLE 5

The biaxially oriented film of high molecular weight polyethylene (sample No. 2) obtained in Example 1 was subjected to surface treatment with plasma discharge in the following procedure under the conditions shown in Table 2 to obtain surface-treated and biaxially oriented films of high molecular weight polyethylene (sample Nos. 7 and 8).

In carrying out the plasma discharge surface treatment of the film (sample No. 2), a plasma discharge apparatus (a product of Toshiba which comprising a microwave generator Model TMG 132F, a plasma generating applicator Model TAW 173 B500, a Three-Stub Tube Model TMU 298) was used, wherein the pressure employed was 0.7 Torr, and the atmosphere gas was oxygen.

Results obtained are shown in Table 2.

EXAMPLE 6

Surface-modified biaxially oriented films of high molecular weight polyethylene (sample Nos. 9 and 10) were obtained by the plasma discharge surface treatment in the same manner as in Example 5 except that the biaxially oriented film of high molecular weight polyethylene (sample No. 4) obtained in Example 2 was used and the surface treatment conditions employed were as shown in Table 2.

Results obtained are shown in Table 2.

TABLE 2

|  | Example 3 | Example 5 | | Example 4 | Example 6 | |
|---|---|---|---|---|---|---|
| Sample No. | 5 | 7 | 8 | 6 | 9 | 10 |
| Sample No. of test material to be heat treated | 2 | 2 | 2 | 4 | 4 | 4 |
| Surface treatment conditions | #1 | #2 | #3 | #4 | #5 | #6 |
| Contact angle to water (°) | 87 | 64 | 67 | 83 | 78 | 64 |
| Tensile strength (GPa) | 0.61 | 0.58 | 0.60 | 0.13 | 0.11 | 0.10 |
| Tensile modulus of elasticity (GPa) | 2.91 | 2.67 | 2.83 | 2.31 | 2.20 | 2.08 |
| Elongation at failure (%) | 73 | 68 | 70 | 24 | 21 | 20 |
| Porosity (%) | 33 | 38 | 38 | 36 | 36 | 35 |
| Number of Gurley seconds (Second) | 7.8 | 8.3 | 8.5 | 17.3 | 17.2 | 15.3 |
| Piercing strength (g) | 48.0 | 43.0 | 46.0 | 35.0 | 31.0 | 30.0 |
| Specific surface area ($m^2$/g) | 43 | 53 | 51 | 50 | 56 | 58 |
| Coefficient of kinetic friction | 0.39 | 0.43 | 0.43 | 0.40 | 0.48 | 0.49 |
| Coefficient of static friction | 0.42 | 0.45 | 0.47 | 0.45 | 0.52 | 0.55 |
| Interlaminar peeling strength (g/cm) | 62.5 | 59.3 | 60.2 | 59.1 | 58.8 | 55.3 |
| Average pore diameter (μm) | 0.2 | 0.3 | 0.3 | 0.3 | 0.4 | 0.4 |

1: Amount of acrylic acid coated 5%, Electron ray irradiation treatment
2: Plasma discharge treatment 1 KW, 10 seconds
3: Plasma discharge treatment 0.5 KW, 10 seconds
4: Amount of acrylic acid coated 3%, Electron ray irradiation treatment
5: Plasma discharge treatment 1 KW, 30 seconds
6: Plasma discharge treatment I KW, 1 minute

COMPARATIVE EXAMPLE 1

Unstretched films (sample Nos. 11 and 12) were obtained by repeating Example 1 except that a high molecular weight polyethylene having an intrinsic viscosity [η] of 8.4 dl/g was used in such proportion as shown in Table 3.

After removing the paraffin wax by extraction from the unstretched films (sample Nos. 11 and 12) containing the same, respectively, the thus treated films were individually subjected to simultaneous biaxial stretching at a stretch ratio as shown in Table 3 and a stretching temperature of 120° C. to obtain stretched films (sample Nos. 13–16). The biaxial stretching machine used was the same as used in Example 1.

Results obtained are shown in Table 3.

TABLE 3

| | Comparative Example 1 | | | | | |
|---|---|---|---|---|---|---|
| Sample No. | 11 | 13 | 14 | 12 | is | 16 |
| Amount of Polyethylene contained (%) | 20 | 20 | 20 | 30 | 30 | 30 |
| Stretch ratio Length × Width (time) | — | 4 × 4 | 6 × 6 | — | 4 × 4 | 6 × 6 |
| Film thickness (μm) | 730 | 12.7 | 8.0 | 830 | 24.6 | 11.5 |
| Tensile strength (GPa) | — | 0.07 | 0.09 | — | 0.06 | 0.08 |
| Tensile modulus of elasticity (GPa) | — | 0.47 | 0.81 | — | 0.91 | 1.20 |
| Elongation at failure (%) | — | 15 | 12 | — | 8 | 8 |
| Porosity (%) | — | 28 | 49 | — | 37 | 40 |
| Number of Gurley seconds (second) | — | 2.3 | 3.2 | — | 4.7 | 5.3 |
| Piercing strength (g) | — | 25.3 | 26.7 | — | 27.1 | 30.7 |
| Specific surface area (m²/g) | — | 52 | 90 | — | 54 | 82 |
| Coefficient of kinetic friction | — | 1.32 | 1.57 | — | 1.41 | 1.65 |
| Coefficient of static friction | — | 2.44 | 2.45 | — | 2.22 | 2.37 |
| Interlaminar peeling strength (g/cm) | — | 25.1 | 24.3 | — | 29.1 | 26.2 |
| Average pore diameter (μm) | — | 3 | 3.1 | — | 1 | 0.7 |
| Number of stretching steps | — | 1 step | 1 step | — | 1 step | 1 step |

TABLE 4

| | Comparative Example 2 | | |
|---|---|---|---|
| Sample No. | 17 | 18 | 19 |
| Amount of Polyethylene contained (%) | 30 | 30 | 30 |
| Stretch ratio Length × Width (time) | — | 4 × 4 | 6 × 6 |
| Film thickness (μm) | 960 | 25.4 | 15.4 |
| Tensile strength (GPa) | — | 0.09 | 0.13 |
| Tensile modulus of elasticity (GPa) | — | 0.75 | 1.19 |
| Elongation at failure (%) | — | 63 | 32 |
| Porosity (%) | — | 23.5 | 43.1 |
| Number of Gurley seconds (second) | — | 35.6 | 32.2 |
| Piercing strength (g) | — | 27.3 | 28.0 |
| Specific surface area (m²/g) | — | 23 | 29 |
| Coefficient of kinetic friction | — | 0.84 | 0.93 |
| Coefficient of static friction | — | 1.27 | 1.52 |
| Interlaminar peeling strength (g/cm) | — | 23.3 | 25.4 |
| Average pore diameter (μm) | — | 0.1> | 0.1> |
| Number of stretching steps | — | 1 step | 1 step |

COMPARATIVE EXAMPLE 2

A high molecular weight polyethylene (intrinsic viscosity [η]=16 dl/g) and a paraffin wax (m.p.=69° C., molecular weight 460) were treated in the same manner as in Example 1 to obtain a raw fabric sheet of about 1 mm in thickness. This raw sheet contained 30% of the high molecular weight polyethylene.

Subsequently, in order to prevent its contraction, the thus obtained raw fabric sheet was fixed by putting it between a pair of metal frames, and the fixed sheet was allowed to stand for about 5 minutes in an n-decane bath kept at 60° C., whereby the paraffin wax was removed by extraction from the raw sheet. In that case, the n-decane was stirred in order to facilitate the removal by extraction of the paraffin wax.

Thereafter, the unstretched sheet fixed by means of metal framed was dried under reduced pressure at room temperature (23° C.). The unstretched film thus dried (sample No. 17) was observed by means of a differential scanning calorimeter (DSC), whereupon a melting point of the paraffin wax was noticed at 69° C. The dried unstretched sheet was then cut into pieces of about 2–3 mm, and these pieces were treated with a Soxhlet's extracter using n-hexane as an extraction solvent, whereby the residual paraffin wax was completely removed from the unstretched sheet. The residual amount of the paraffin wax obtained from a difference in weight between the samples prior and after the Soxhlet extraction was 8% based on the weight of the dried unstretched sheet.

Subsequently, this unstretched sheet was subjected to the same biaxial stretching as in Example 1.

The biaxially oriented film thus obtained was fixed by means of metal frames in two directions, washed with n-hexane to remove the residual paraffin and dried at room temperature (23° C.) to obtain biaxially oriented films (samples Nos. 18 and 19). Results are shown in Table 4.

COMPARATIVE EXAMPLE 3

The stretched film (sample No. 1) obtained in Example 1 was fixed by means of metal frames so that the film will not contract, and the fixed film was heated under such a standard length constraint for 1 minute by means of air oven preset at a temperature of 155° C. After heating the film became transparent partially, and the transparent portion of the film was observed under a scanning type electron microscope, whereupon no microporous structure of the film was noticed.

COMPARATIVE EXAMPLE 4

The stretched film (sample No. 14) obtained in Comparative Example 1 was fixed by means of metal frames so that the film will not contract, and the fixed film was heated under such a standard length constraint for 1 minute by means of an air oven preset at a temperature of 155° C. After heating, the film became transparent partially, and the transparent portion of the film was observed under a scanning type electron microscope, whereupon no microporous structure of the film was noticed.

EXAMPLE 7

A particulate mixture obtained by mixing uniformly together 30% by weight of a particulate high molecular weight polyethylene (intrinsic viscosity [η]=16 dl/g), 70% by weight of particulate paraffin wax (m.p.=69° C., molecular weight 460) and 0.5%, based on the high molecular weight polyethylene, of 3,4-di-tert-butyl-4-hydroxytoluene as a process stabilizer was melt kneaded by means of a twin screw-type melt kneading machine Laboplastomill (20R-200 Model of Toyo Seiki Seisakusho) at 190° C. for 10 minutes to obtain a uniform molten mixture. In that case, the number of revolutions of the screws was 50 r.p.m.

This molten mixture was separated in the molten state, placed, as it was, between a pair of press plates, adjusted in thickness by means of a metal frame, and immediately thereafter put between hot plates of a hot press preset at 190° C., whereby the molten mixture was processed into a sheet form. After 5-minute compression by means of the hot press, the molten mixture held between the press plates was compressed by means of a cold press adjusted to 20° C., cooled and solidified to obtain a raw fabric sheet of about 780 µm in thickness.

Subsequently, in order to prevent contraction, the raw fabric sheet was fixed by means of a pair of metal frames wherein said raw fabric sheet was held, and allowed to stand for about 2 hours in a bath of n-decane kept at 60° C., whereby the paraffin wax was extracted and removed from said raw sheet. In that case, the n-decane was stirred in order to facilitate the extraction and removal of the paraffin wax.

After that, the unstretched sheet held between the metal frames was dried under reduced pressure at room temperature (23° C.).

Subsequently, the unstretched sheet thus dried was subjected to biaxial stretching to obtain a stretched film (sample Nos. 20–21).

In that case, there was used a tentering type biaxial stretching machine of Heavy Model of Toyo Seiki Seisakusho K.K.

When the sheet is subjected to simultaneous stretching, the lengthwise stretching was carried out simultaneously with the crosswise stretching until desired stretch ratio was attained. When the film is subjected to successive stretching, the lengthwise stretching was carried out while maintaining the film in a definite width in the cross wise direction, and the crosswise stretching was then carried out while maintaining a definite width of the film stretched in the lengthwise direction.

The conditions under which the samples were biaxially stretched are shown in Table 5.

TABLE 5

| Sample No. | Stretching method | Stretching temperature (°C.) | Stretching ration (time) Length | Width |
|---|---|---|---|---|
| 20 | Simultaneous biaxial stretch | 120 | 6 | 6 |
| 21 | Successive biaxial stretch | 120 | 6 | 6 |

The stretched films (sample Nos. 20–21) obtained under the conditions in Table 5 were fixed by means of a pair of metal frames and subjected to heat treatment under the conditions as shown in Table 7.

The heat treatment was performed by using an oven (Perfect Oven: manufactured and sold by Tobai Seisakusho).

Results obtained are shown in Tables 6–7.

TABLE 6

| | Example 7 (sample No. 20) | | | | | | | | |
|---|---|---|---|---|---|---|---|---|---|
| Heating temperature (°C.) | — | 150 | 140 | 140 | 140 | 130 | 130 | 130 | 120 |
| Heating time (Sec) | — | 60 | 600 | 60 | 10 | 600 | 60 | 10 | 600 |
| Film thickness µm | 25.0 | 15.7 | 16.2 | 17.1 | 18.5 | 20.3 | 20.5 | 22.3 | 24.9 |
| Tensile strength (GPa) | 0.22 | 0.21 | 0.40 | 0.38 | 0.34 | 0.35 | 0.33 | 0.29 | 0.28 |
| Tensile modulus of elasticity (GPa) | 1.2 | 1.1 | 1.6 | 1.5 | 1.4 | 1.3 | 1.3 | 1.2 | 1.1 |
| Elongation at failure (%) | 73 | 53 | 85 | 82 | 80 | 81 | 80 | 75 | 73 |
| Porosity | 55.5 | 32.2 | 39.8 | 40.4 | 43.2 | 44.9 | 45.2 | 50.1 | 55.3 |
| Number of Gurley seconds (Sec.) | 7.3 | * | 9.8 | 9.4 | 8.3 | 7.9 | 7.8 | 7.6 | 7.2 |
| Piercing strength (g) | 45 | 46 | 52 | 47 | 45 | 45 | 43 | 44 | 46 |
| Specific surface area ($m^2/g$) | 94 | 30 | 51 | 57 | 63 | 79 | 82 | 91 | 94 |
| Coefficient of kinetic friction | 1.69 | 0.39 | 0.42 | 0.45 | 0.62 | 1.05 | 1.13 | 1.42 | 1.68 |
| Coefficient of static friction | 2.30 | 0.40 | 0.45 | 0.56 | 0.84 | 1.41 | 1.52 | 1.93 | 2.28 |
| Interlaminar peeling strength (g/cm) | 29.0 | 70.3 | 66.6 | 65.3 | 60.1 | 37.2 | 35.3 | 35.4 | 31.2 |
| Average pore diameter (µm) | 0.6 | <0.1 | 0.3 | 0.3 | 0.3 | 0.4 | 0.4 | 0.4 | 0.5 |

*: 180 seconds or more

TABLE 7

| | Example 7 (sample No. 21) | | | | | | | | |
|---|---|---|---|---|---|---|---|---|---|
| Heating temperature (°C.) | — | 150 | 140 | 140 | 140 | 130 | 130 | 130 | 120 |
| Heating time (Sec) | — | 60 | 600 | 60 | 10 | 600 | 60 | 10 | 600 |
| Film thickness μm | 43.2 | 20.3 | 30.1 | 34.5 | 39.2 | 38.6 | 40.9 | 42.9 | 43.0 |
| Tensile strength (GPa) | | | | | | | | | |
| Width | 0.22 | 0.18 | 0.42 | 0.38 | 0.33 | 0.31 | 0.31 | 0.26 | 0.23 |
| Length | 0.25 | 0.20 | 0.43 | 0.40 | 0.37 | 0.35 | 0.34 | 0.28 | 0.25 |
| Tensile modulus of elasticity (GPa) | | | | | | | | | |
| Width | 1.1 | 0.9 | 1.5 | 1.4 | 1.3 | 1.2 | 1.1 | 1.1 | 1.1 |
| Length | 0.8 | 0.7 | 1.6 | 1.5 | 1.2 | 0.9 | 0.9 | 0.9 | 0.8 |
| Elongation at failure (%) | | | | | | | | | |
| Width | 74 | 51 | 83 | 80 | 76 | 76 | 74 | 73 | 72 |
| Length | 73 | 48 | 81 | 79 | 75 | 73 | 74 | 74 | 73 |
| Porosity (%) | 75.1 | 43.8 | 61.8 | 67.0 | 71.2 | 70.3 | 72.5 | 68.7 | 75.0 |
| Number of Gurley seconds (Sec.) | 2.7 | * | 2.0 | 2.1 | 2.2 | 2.1 | 2.2 | 2.3 | 2.6 |
| Piercing strength (g) | 44 | 46 | 49 | 47 | 47 | 46 | 45 | 44 | 44 |
| Specific surface area ($m^2 \cdot g$) | 121 | 42 | 83 | 89 | 98 | 94 | 105 | 117 | 120 |
| Coefficient of kinetic friction | 1.84 | 0.40 | 0.43 | 0.51 | 0.68 | 0.94 | 1.37 | 1.49 | 1.81 |
| Coefficient of static friction | 2.73 | 0.43 | 0.57 | 0.62 | 0.98 | 1.32 | 1.87 | 2.21 | 2.70 |
| Interlaminar peeling strength (g/cm) | | | | | | | | | |
| Width | 27.0 | 75.8 | 64.1 | 63.7 | 61.5 | 37.2 | 35.5 | 33.4 | 27.2 |
| Length | 25.3 | 70.3 | 63.2 | 59.2 | 60.3 | 37.3 | 34.0 | 32.2 | 26.4 |
| Average pore diameter (μm) | 0.9 | <0.1 | 0.3 | 0.3 | 0.3 | 0.5 | 0.5 | 0.6 | 0.8 |

*: 180 seconds or more

What is claimed is:

1. A surface-modified biaxially oriented film comprising high molecular weight polyethylene having an intrinsic viscosity (η) of at least 5.0 dl/g measured at 135° C. in decalin, said film having a gas permeable structure comprising random-arranged microfibrils, and said film having the following properties:

(i) an average pore diameter of from 0.1 to 10 μm;
   (ii) a void content of from 20 to 70%;
   (iii) a tangent tensile modulus, in every direction, of not less than 0.6 GPa;
   (iv) a tensile strength, in every direction, of not less than 0.1 GPa;
   (v) a coefficient of static friction of not more than 1.0;
   (vi) a coefficient of kinetic friction of not more than 1.0; and,
   (vii) a contact angle of the film surface to a water drop of not more than 90°.

2. The surface-modified biaxially oriented film of claim 1 wherein (vii) the contact angle is not more than 80°.

3. The surface-modified biaxially oriented film of claim 2 wherein (vii) the contact angle is not more than 70°.

4. The surface-modified biaxially oriented film of claim 2 characterized by (i) an average pore diameter of 0.1 to 10 μm; (ii) a void content of 30% to 60%; (iii) a tangent modulus, in every direction, of not less than 1.2 GPa; (iv) a tensile strength, in every direction, of at least 0.3 GPa; (v) a coefficient of static friction of not more than 0.7; and (vi) a coefficient of kinetic friction of not more than 0.7.

5. A biaxially oriented film comprising microfibrils in which (i) an average pore diameter is 0.1–10 μm,
   (ii) a void content is 20–70%,
   (iii) a tensile modulus is not less than 0.6 GPa,
   (iv) a tensile strength is not less than 0.1 GPa,
   (v) a coefficient of static friction is not more than 1.0,
   (vi) a coefficient of kinetic friction is not more than 1.0, and wherein the surface of the biaxially oriented film has been subjected to modification by corona discharge treatment, plasma discharge treatment or electron radiation treatment, whereby the contact angle of the modified film surface to a water drop is not more than 90°.

* * * * *